(12) United States Patent
Oberheide et al.

(10) Patent No.: US 9,608,814 B2
(45) Date of Patent: Mar. 28, 2017

(54) SYSTEM AND METHOD FOR CENTRALIZED KEY DISTRIBUTION

(71) Applicant: Duo Security, Inc., Ann Arbor, MI (US)

(72) Inventors: Jon Oberheide, Ann Arbor, MI (US); Douglas Song, Ann Arbor, MI (US)

(73) Assignee: Duo Security, Inc., Ann Arbor, MI (US)

( * ) Notice: Subject to any disclaimer, the term of this patent is extended or adjusted under 35 U.S.C. 154(b) by 0 days.

(21) Appl. No.: 14/482,829

(22) Filed: Sep. 10, 2014

(65) Prior Publication Data

US 2015/0074408 A1    Mar. 12, 2015

Related U.S. Application Data

(60) Provisional application No. 61/876,109, filed on Sep. 10, 2013.

(51) Int. Cl.
  *H04L 29/06* (2006.01)
  *H04L 9/08* (2006.01)
(52) U.S. Cl.
  CPC .......... *H04L 9/0894* (2013.01); *H04L 9/083* (2013.01)
(58) Field of Classification Search
  CPC ........ H04L 9/08; H04L 63/062; H04L 9/083; H04L 9/0822; H04L 63/0428; H04L 9/0894
  USPC ........................................................ 380/279
  See application file for complete search history.

(56) References Cited

U.S. PATENT DOCUMENTS

| | | | |
|---|---|---|---|
| 5,838,792 A | 11/1998 | Ganesan | |
| 5,870,723 A | 2/1999 | Pare et al. | |
| 6,119,096 A | 9/2000 | Mann et al. | |
| 6,209,091 B1 | 3/2001 | Sudia et al. | |
| 6,311,272 B1 | 10/2001 | Gressel | |
| 6,694,025 B1 * | 2/2004 | Epstein et al. | 380/279 |
| 6,758,394 B2 | 7/2004 | Maskatiya et al. | |
| 6,823,359 B1 | 11/2004 | Heidingsfeld et al. | |
| 6,934,858 B2 | 8/2005 | Woodhill | |
| 6,956,950 B2 | 10/2005 | Kausik | |
| 6,996,716 B1 | 2/2006 | Hsu | |
| 7,096,354 B2 * | 8/2006 | Wheeler et al. | 713/155 |
| 7,331,518 B2 | 2/2008 | Rable | |
| 7,340,600 B1 * | 3/2008 | Corella | H04L 63/0823 713/155 |
| 7,447,784 B2 | 11/2008 | Eun | |

(Continued)

OTHER PUBLICATIONS

Simske et al., "APEX: Automated Policy Enforcement eXchange", Sep. 21-24, 2010, ACM, pp. 139-142.

(Continued)

*Primary Examiner* — Mahfuzur Rahman
*Assistant Examiner* — Narciso Victoria
(74) *Attorney, Agent, or Firm* — Jeffrey Schox; Padowithz Alce (57) ABSTRACT

A system and method for distributing key pair credentials that includes receiving a public key message at a key master service, wherein the public key message originates from a first client application; associating a key identifier with the public key; storing the public key at the key master service indexed at least by a key identifier; receiving a request for a public key from an outside service, wherein the request specifies a key identifier; and responding to the request with a public key according to the key identifier.

6 Claims, 10 Drawing Sheets

(56) References Cited

U.S. PATENT DOCUMENTS

| | | | |
|---|---|---|---|
| 7,463,637 B2 | 12/2008 | Bou-Diab et al. | |
| 7,496,662 B1 | 2/2009 | Roesch et al. | |
| 7,526,792 B2 | 4/2009 | Ross | |
| 7,562,382 B2 | 7/2009 | Hinton et al. | |
| 7,574,733 B2 | 8/2009 | Woodhill | |
| 7,711,122 B2 | 5/2010 | Allen et al. | |
| 7,793,110 B2 | 9/2010 | Durfee et al. | |
| 7,953,979 B2 | 5/2011 | Borneman et al. | |
| 7,982,595 B2 | 7/2011 | Hanna et al. | |
| 8,028,329 B2 | 9/2011 | Whitcomb | |
| 8,136,148 B1 | 3/2012 | Chayanam et al. | |
| 8,161,527 B2 | 4/2012 | Curren | |
| 8,200,980 B1 | 6/2012 | Robinson et al. | |
| 8,245,044 B2 | 8/2012 | Kang | |
| 8,332,627 B1 | 12/2012 | Matthews et al. | |
| 8,335,933 B2 | 12/2012 | Humphrey et al. | |
| 8,397,301 B2 | 3/2013 | Hering et al. | |
| 8,402,526 B2 | 3/2013 | Ahn | |
| 8,458,798 B2 | 6/2013 | Williams et al. | |
| 8,495,720 B2 | 7/2013 | Counterman | |
| 8,499,339 B2 | 7/2013 | Chao et al. | |
| 8,510,820 B2 | 8/2013 | Oberheide et al. | |
| 8,538,028 B2* | 9/2013 | Yeap et al. | 380/278 |
| 8,539,567 B1 | 9/2013 | Logue et al. | |
| 8,627,438 B1 | 1/2014 | Bhimanaik | |
| 8,646,060 B1 | 2/2014 | Ayed | |
| 8,646,086 B2 | 2/2014 | Chakra et al. | |
| 8,689,287 B2 | 4/2014 | Bohmer et al. | |
| 8,700,729 B2 | 4/2014 | Dua | |
| 8,732,475 B2 | 5/2014 | Fahrny et al. | |
| 8,732,839 B2 | 5/2014 | Hohl | |
| 8,745,703 B2 | 6/2014 | Lambert et al. | |
| 8,763,077 B2 | 6/2014 | Oberheide et al. | |
| 8,806,609 B2 | 8/2014 | Gladstone et al. | |
| 2,639,997 A1 | 9/2014 | Wiesmaier et al. | |
| 8,850,516 B1 | 9/2014 | Hrebicek et al. | |
| 8,893,230 B2 | 11/2014 | Oberheide et al. | |
| 8,898,762 B2 | 11/2014 | Kang | |
| 9,223,961 B1 | 12/2015 | Sokolov | |
| 9,282,085 B2 | 3/2016 | Oberheide et al. | |
| 9,391,980 B1 | 7/2016 | Krahn et al. | |
| 2002/0013898 A1 | 1/2002 | Sudia et al. | |
| 2002/0123967 A1* | 9/2002 | Wang | 705/51 |
| 2002/0136410 A1* | 9/2002 | Hanna | H04L 9/088 380/277 |
| 2003/0061506 A1 | 3/2003 | Cooper et al. | |
| 2003/0115452 A1 | 6/2003 | Sandhu et al. | |
| 2003/0120931 A1 | 6/2003 | Hopkins et al. | |
| 2003/0126472 A1 | 7/2003 | Banzhof | |
| 2003/0147536 A1 | 8/2003 | Andivahis et al. | |
| 2004/0064706 A1 | 4/2004 | Lin et al. | |
| 2004/0218763 A1 | 11/2004 | Rose et al. | |
| 2005/0218215 A1 | 10/2005 | Lauden | |
| 2005/0221268 A1 | 10/2005 | Chaar et al. | |
| 2005/0240522 A1 | 10/2005 | Kranzley et al. | |
| 2005/0268107 A1 | 12/2005 | Harris et al. | |
| 2006/0031938 A1 | 2/2006 | Choi | |
| 2006/0059569 A1 | 3/2006 | Dasgupta et al. | |
| 2006/0130139 A1 | 6/2006 | Sobel et al. | |
| 2006/0165060 A1 | 7/2006 | Dua | |
| 2006/0182276 A1 | 8/2006 | Sandhu et al. | |
| 2006/0184788 A1 | 8/2006 | Sandhu et al. | |
| 2006/0242692 A1* | 10/2006 | Thione | G06F 21/32 726/9 |
| 2007/0016948 A1 | 1/2007 | Dubrovsky et al. | |
| 2007/0081667 A1 | 4/2007 | Hwang | |
| 2007/0156659 A1 | 7/2007 | Lim | |
| 2007/0186106 A1 | 8/2007 | Ting et al. | |
| 2007/0199060 A1 | 8/2007 | Touboul | |
| 2007/0228148 A1 | 10/2007 | Rable | |
| 2007/0250914 A1 | 10/2007 | Fazal | |
| 2007/0258594 A1 | 11/2007 | Sandhu et al. | |
| 2007/0284429 A1 | 12/2007 | Beeman | |
| 2007/0297607 A1 | 12/2007 | Ogura et al. | |
| 2008/0049642 A1 | 2/2008 | Gudipudi et al. | |
| 2008/0069347 A1 | 3/2008 | Brown et al. | |
| 2008/0120411 A1 | 5/2008 | Eberle | |
| 2008/0229104 A1 | 9/2008 | Ju et al. | |
| 2009/0055906 A1 | 2/2009 | Wendorff | |
| 2009/0077060 A1 | 3/2009 | Sermersheim et al. | |
| 2009/0167489 A1 | 7/2009 | Nan et al. | |
| 2009/0187986 A1 | 7/2009 | Ozeki | |
| 2009/0198997 A1 | 8/2009 | Yeap et al. | |
| 2009/0210705 A1 | 8/2009 | Chen | |
| 2009/0271863 A1 | 10/2009 | Govindavajhala et al. | |
| 2009/0300596 A1 | 12/2009 | Tyhurst et al. | |
| 2009/0300707 A1 | 12/2009 | Garimella et al. | |
| 2010/0023781 A1 | 1/2010 | Nakamoto | |
| 2010/0042954 A1 | 2/2010 | Rosenblatt et al. | |
| 2010/0069104 A1* | 3/2010 | Neil et al. | 455/466 |
| 2010/0100725 A1 | 4/2010 | Ozzie et al. | |
| 2010/0114740 A1 | 5/2010 | Dominguez et al. | |
| 2010/0115578 A1 | 5/2010 | Nice et al. | |
| 2010/0121767 A1 | 5/2010 | Coulter et al. | |
| 2010/0125737 A1 | 5/2010 | Kang | |
| 2010/0131755 A1 | 5/2010 | Zhu et al. | |
| 2010/0180001 A1 | 7/2010 | Hardt | |
| 2010/0202609 A1 | 8/2010 | Sandhu et al. | |
| 2010/0216425 A1 | 8/2010 | Smith | |
| 2010/0217986 A1 | 8/2010 | Schneider | |
| 2010/0233996 A1 | 9/2010 | Herz et al. | |
| 2010/0257610 A1 | 10/2010 | Hohl | |
| 2010/0263021 A1 | 10/2010 | Arnott et al. | |
| 2010/0274859 A1 | 10/2010 | Bucuk | |
| 2010/0330969 A1 | 12/2010 | Kim et al. | |
| 2011/0026716 A1 | 2/2011 | Tang et al. | |
| 2011/0086616 A1 | 4/2011 | Brand et al. | |
| 2011/0107389 A1 | 5/2011 | Chakarapani | |
| 2011/0113484 A1 | 5/2011 | Zeuthen | |
| 2011/0119765 A1 | 5/2011 | Hering et al. | |
| 2011/0138469 A1 | 6/2011 | Ye et al. | |
| 2011/0145900 A1 | 6/2011 | Chern | |
| 2011/0197267 A1 | 8/2011 | Gravel et al. | |
| 2011/0219449 A1 | 9/2011 | St. Neitzel et al. | |
| 2011/0277025 A1 | 11/2011 | Counterman | |
| 2011/0302410 A1* | 12/2011 | Clarke | H04L 9/0872 713/155 |
| 2011/0302630 A1 | 12/2011 | Nair et al. | |
| 2012/0063601 A1 | 3/2012 | Hart | |
| 2012/0090028 A1 | 4/2012 | Lapsley et al. | |
| 2012/0096274 A1 | 4/2012 | Campagna et al. | |
| 2012/0198050 A1 | 8/2012 | Maki et al. | |
| 2012/0198228 A1 | 8/2012 | Oberheide et al. | |
| 2012/0216239 A1 | 8/2012 | Yadav et al. | |
| 2012/0227098 A1 | 9/2012 | Obasanjo et al. | |
| 2012/0290841 A1 | 11/2012 | Jentzsch | |
| 2012/0300931 A1 | 11/2012 | Ollikainen et al. | |
| 2013/0042002 A1 | 2/2013 | Cheeniyil et al. | |
| 2013/0060708 A1 | 3/2013 | Oskolkov et al. | |
| 2013/0081101 A1 | 3/2013 | Baer et al. | |
| 2013/0097585 A1 | 4/2013 | Jentsch et al. | |
| 2013/0110676 A1 | 5/2013 | Kobres | |
| 2013/0117826 A1 | 5/2013 | Gordon et al. | |
| 2013/0124292 A1 | 5/2013 | Juthani | |
| 2013/0125226 A1 | 5/2013 | Shah et al. | |
| 2013/0174246 A1 | 7/2013 | Schrecker et al. | |
| 2013/0179681 A1 | 7/2013 | Benson et al. | |
| 2013/0239167 A1 | 9/2013 | Sreenivas et al. | |
| 2013/0239168 A1 | 9/2013 | Sreenivas et al. | |
| 2013/0239177 A1 | 9/2013 | Sigurdson et al. | |
| 2013/0246281 A1 | 9/2013 | Yamada et al. | |
| 2013/0263211 A1 | 10/2013 | Neuman et al. | |
| 2013/0310006 A1 | 11/2013 | Chen et al. | |
| 2013/0326224 A1 | 12/2013 | Yavuz | |
| 2013/0326493 A1 | 12/2013 | Poonamalli et al. | |
| 2014/0019752 A1 | 1/2014 | Yin et al. | |
| 2014/0047546 A1 | 2/2014 | Sidagni | |
| 2014/0181517 A1 | 6/2014 | Alaranta et al. | |
| 2014/0181520 A1 | 6/2014 | Wendling et al. | |
| 2014/0188796 A1 | 7/2014 | Fushman et al. | |
| 2014/0201841 A1 | 7/2014 | Deshpande et al. | |
| 2014/0208405 A1 | 7/2014 | Hashai | |
| 2014/0235230 A1 | 8/2014 | Raleigh | |
| 2014/0237236 A1 | 8/2014 | Kalinichenko et al. | |

(56) References Cited

U.S. PATENT DOCUMENTS

| | | |
|---|---|---|
| 2014/0244993 A1 | 8/2014 | Chew |
| 2014/0245278 A1 | 8/2014 | Zellen |
| 2014/0245396 A1 | 8/2014 | Oberheide et al. |
| 2014/0247140 A1 | 9/2014 | Proud |
| 2014/0351954 A1 | 11/2014 | Brownell et al. |
| 2014/0376543 A1 | 12/2014 | Malatack et al. |
| 2015/0012914 A1 | 1/2015 | Klein et al. |
| 2015/0026461 A1 | 1/2015 | Devi |
| 2015/0237026 A1 | 8/2015 | Kumar |
| 2015/0242643 A1 | 8/2015 | Hankins et al. |
| 2016/0056962 A1 | 2/2016 | Mehtala |
| 2016/0164866 A1 | 6/2016 | Oberheide et al. |
| 2016/0180072 A1 | 6/2016 | Ligatti et al. |
| 2016/0286391 A1 | 9/2016 | Khan |

OTHER PUBLICATIONS

Symantec, Administration Guide for Symantec TM Endpoint Protection and Symantec Network Access Control, Aug. 1, 2007.
Goldfeder et al., Securing Bitcoin wallets via a new DSA/ECDSA threshold signature scheme, http://www.cs.princeton.edu/~stevenag/threshold_sigs.pdf.
Symantec, Administration guide for symantec Endpoint protection and symantec network access control, 2009, version 11.00.05.00.00.
Edge, Kenneth, et al. "The use of attack and protection trees to analyze security for an online banking system." System Sciences, 2007. HICSS 2007. 40th Annual Hawaii International Conference on. IEEE, 2007.
Neuenhofen, Kay, and Mathew Thompson. "A secure marketplace for mobile java agents." Proceeding of the second international Conference on Autonomous agents. ACM, 1998. (pp. 212-218).

\* cited by examiner

SYSTEM AND METHOD FOR CENTRALIZED KEY DISTRIBUTION

CROSS-REFERENCE TO RELATED APPLICATIONS

This application claims the benefit of U.S. Provisional Application Ser. No. 61/876,121, filed on 10 Sep. 2013 which is incorporated in its entirety by this reference.

TECHNICAL FIELD

This invention relates generally to the cryptographic key field, and more specifically to a new and useful system and method for centralized key distribution in the cryptographic key field.

BACKGROUND

In dealing with cryptographic keys, many systems rely on a private/public key pair system. Uses of key pairs have numerous applications, one of them being authentication of an account. When the destination of the public key is known or is easily copyable, the key can be transferred to the destination. But there are many cases where the verifying party (i.e., the one who needs the public key) is unknown or unavailable at the time of key generation. One common scenario is where the key pair is generated on a mobile device; transferring a public key can be cumbersome and possibly insecure depending on the approach. Thus, there is a need in the cryptographic key field to create a new and useful system and method for centralized key distribution. This invention provides such a new and useful system and method.

DESCRIPTION OF THE PREFERRED EMBODIMENTS

Figure 1:
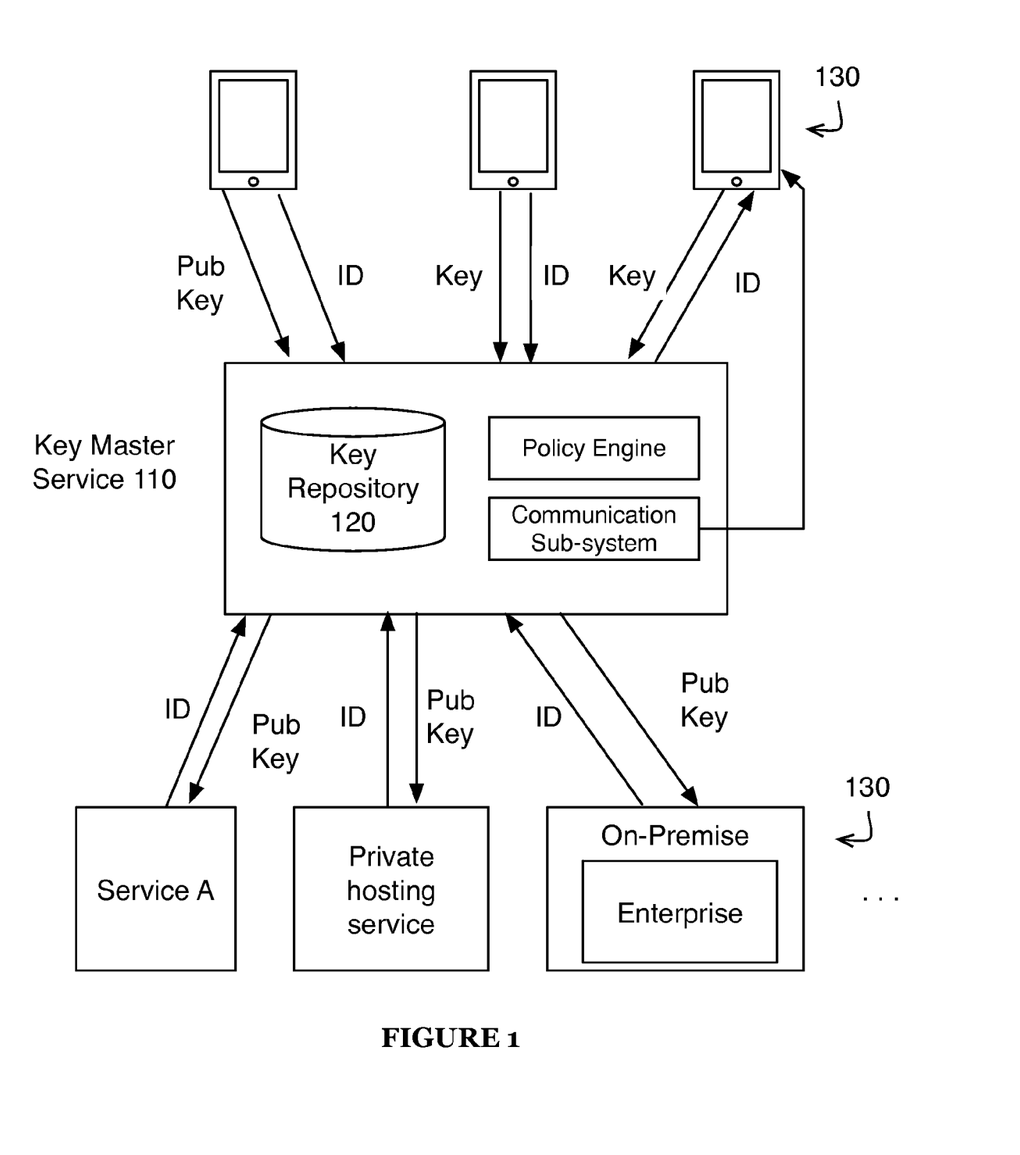
FIG. 1 is a schematic representation of a system of a preferred embodiment.

The following description of preferred embodiments of the invention is not intended to limit the invention to these preferred embodiments, but rather to enable any person skilled in the art to make and use this invention.
1. System for Cryptographic Key Distribution As shown in FIG. 1, a system for cryptographic key distribution of a preferred embodiment includes a key master service 100 with a public key repository 120 and integrated with at least one client application 130 and an outside service 140. The system is preferably used to enable a centralized activation service that function to provide asynchronous creation and distribution of cryptographic keys. In particular, the system is used for the distribution of key pairs between the client application 130 and the outside service 140. The system can be architected and configured to enable user driven identity from the client application 130 as opposed to the user receiving identity information from an outside service 140 and then later establishing on a client application. The system is particularly applicable to situations where the client device is not pre-configured for a public key destination. In an exemplary scenario, a two-factor authentication platform may enable a client application 130 to be used as the second factor of authentication for a variety of outside systems, and the outside systems are not pre-configured in the application. The system can act as the mechanism to transfer a public key to one of these outside devices. Additionally, the system may provide security and policy around key distribution while simultaneously simplifying the user experience.

The system is configured for use during activation of an account on a client application 130. Herein, a two-factor application is used as a preferred version of a client application 130 but the system may be used with any suitable system where a key is distributed between a client application 130 and a service. The system is preferably used during the activation portion of an account on a client device such as when creating a new account, adding a new device to the account, or updating an existing device and account. In one exemplary user flow, a user will decide to use the two-factor authentication with an outside service 140. The user can create a new two-factor authentication account on the device, which will eventually be associated with an outside service 140. The account on the device is instantiated independently of an account on the outside service 140. An account instantiated independently is preferably defined as an account wherein an associated outside service 140 has no data linking or referencing the account instance on the device to an account on the outside service 140. The account on the device is preferably synchronized and linked with an account on the outside service through the transfer of a key identifier. A key pair is generated for the account instance on the client application 130. The public key is transmitted to a key master service no, and in response receives an identifier. The identifier is preferably in a format such that the identifier can be easily transferred to an outside service 140. The identifier in one implementation is a code displayed to the user. The user then proceeds to login to an account or create an account on the target outside service 140. For example, a user may access a control panel on a web application of the outside service where a second factor of authentication can be registered. An option is selected to configure two-factor authentication through the two-factor authentication platform, and the user supplies the identifier. In response to receiving the identifier, the outside service 140 fetches the public key associated with the identifier from the key master service no. With possession of the public key, the client application 130 and the outside entity 140 can use the key pair for encrypted communication with the key pair.

The key master service no of the preferred embodiment functions as a centralized key escrow service. The key master service 110 acts as a singular or cohesive entity that can be reliably used as a transfer channel for distributing key pairs. The key master service no adds an abstraction layer between a device and an outside service 140 such that client devices 130 and outside services 140 talk to the key master service no directly to obtain or transfer keys. The key master service 110 is preferably an internet accessible service operative on a server, a computer cluster, a distributed computing system, and/or any suitable computing environment. The key master service no includes an interface for client application 130s to activate key pairs, and the key master service no can include a similar or related interface for outside services 140 to obtain public keys. The interfaces can include an authentication process such that client application 130s and/or outside services 140 have to be authenticated.

The key master service 110 will often be used alongside a multi-tenant platform and can identify and optionally track the entities involved in key pair transfers. As a multi-tenant platform the key master service 110 can facilitate key pair distribution for a plurality of distinct client applications 130 and outside services 140. The different client applications 130 and outside services 140 preferably include programmatic integration with the key master service no through one or more application programming interfaces (APIs). In one example, a client application 130 is developed and released that enables multiple outside services to be authenticated by the client application as a second factor of authentication. Various outside services can enable use of two-factor authentication using this universal 2FA app by integrating public key retrieval with the key master service no. Additionally, if an enterprise wanted to create a customized universal 2FA app for use by employees, then this client application could similarly be developed and remain compatible with the multi-tenant key master service no and the configured outside service 140.

The key master service 110 can additionally include a policy engine that functions to regulate and apply policy to key distribution. In one variation, the public key pairs are only stored temporarily. The policy engine is preferably at least communicatively integrated with the public key repository 120. The policy engine can be configured for application of various forms of policy. In one variation, the policy engine includes a time expiration monitor that deletes, removes, or otherwise prevents access to a public key after a time expiration window has expired for a particular public key. For example, a public key may only be valid for 24 hours after creation. In another variation, the policy engine is integrated with a key request engine (or at least the API service provided to outside services 140. The policy can regulate access to a public key based on the access conditions. The policy engine can restrict the number of access attempts, authenticate access (with user provided credentials or outside service credentials), machine address restrictions, geographic meta data restrictions, time of day restrictions on access, and/or any suitable policy related to the conditions relating to key requests.

The key master service 110 can additionally include a communication sub-system that functions to establish event notification/communication. The event notification is preferably in response to activity with a key pair, and the destination of the communication is preferably the client application associated with the relevant key pair. For example, a client application may receive a push notification when an outside service successfully receives a public key corresponding to the private key of the device. The client application may alternatively receive notifications that a key has expired, that an access attempt was blocked, that an expired identifier was used, or that any suitable event occurred. Alternatively, the destination endpoint can be registered as an external server or other suitable destination. For example, notifications of key pair access activity associated with an account of the key master service 110 may be sent to an application service of the account holder so that server side updates can be made.

In an alternative embodiment, the key master service no can additionally generate key pairs and appropriately distribute the private key to a client application 130. The key master service 110 preferably includes a public key repository 120.

The public key repository 120 functions to store public keys of various devices/applications. The public key repository 120 can be a database of key records. A key record will include the public key and at least one identifier. The identifier is preferably a human transcribable code that can be used to uniquely reference the public key. It acts as a simplified identifier so that a user can provide it to an outside service 140, and the outside service 140 can request the public key associated with the identifier. The identifier could alternatively be an audio or visual signal such as a QR code that facilitates manual transfer to the outside service 140. The key record can additionally store other associated information. In one variation, additional authentication information such as a username and/or password information may be used. In another variation, a destination address of the client application 130, device, or user can be stored. The destination address can be used to send information or notifications about events that occur with the associated key pair with the communication sub-system. For example, once a public key has been transferred, a push notification can be delivered to the destination address to inform a user of completed key transfer or completed activation.

The client application 130 functions as the system using the private key of the key pair. In many implementations, the client application 130 will use the private key to talk with an outside service 140, and the outside service 140 uses a corresponding public key to decrypt the communication as is commonly used in asymmetric cryptography. The client application 130 can alternatively use a public key distribution model or any suitable key model wherein at least one token is shared from one party to a second party. The client application 130 is preferably operable on a user operated host device. The host device is preferably a mobile computing device such as a mobile phone, a tablet, a wearable computing device, but the host device can alternatively be a desktop computing device, a TV connected computing device, or any suitable computing device. The client application 130 may be designed for use with a wide variety of outside services 140. More preferably, the client application 130 can be designed to enable registering for use with an outside entity ad hoc (i.e., without needing to have prior registration or communication with the outside entity). Additionally, from a usability perspective, the client application 130 can be designed with user-driven account activation. Rather than having an outside system create an account and configuring the account information on the device, the user can initiate account activation directly from the client application 130. As one benefit of the system, user-driven activation can be achieved even before engaging an outside service 140. Similarly, the user-driven activation can be achieved before communicating with a particular application. In one variation, an enterprise application may create an easy enrollment mode for new employees, wherein the enrollment mode generates a set of different key pair tokens for various services used by the enterprise. Then the new employee can easily be set up 2FA with the various services used by the employee. In some cases, the potential outside services 140 is not preconfigured in the client application 130, and in other cases could not be preconfigured. Accordingly, the client application 130 may not have an address or have knowledge of an interface to deliver a public key when initiating account activation from the client application 130. The client application 130 operates cooperatively with the key master service 110 to facilitate distributing the public keys to the appropriate destination.

Figure 2:
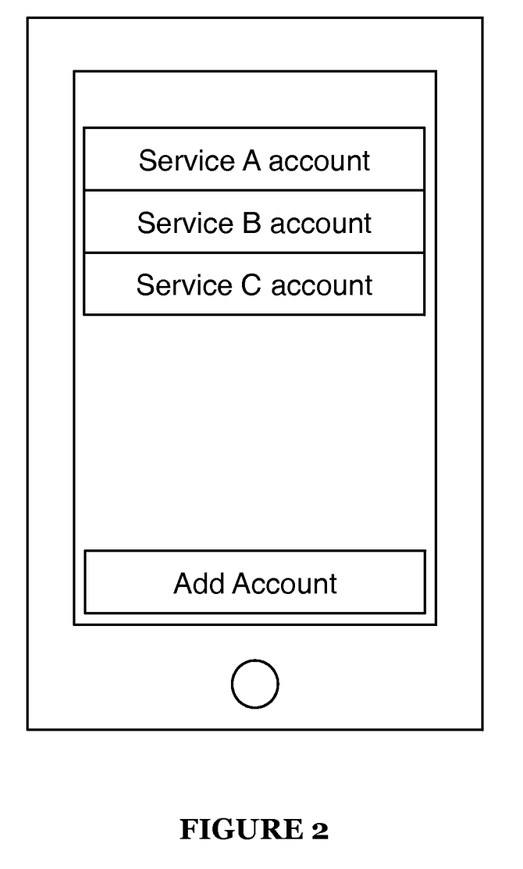
FIG. 2 is a schematic representation of an exemplary implementation of the client application.

In a preferred implementation, the client application 130 is a two-factor authentication application that is used to provide a second channel of authentication. The two-factor authentication application is used in connection with a cloud hosted two-factor authentication platform that enables outside services 140 to easily add at least a second factor of authentication with their authentication process. Developers preferably integrate with the two-factor authentication platform using appropriate SDKs and/or APIs. The client application 130, however, can be distributed in a generic form such that outside services 140 using the two-factor authentication platform can have users use the two-factor authentication application to complete two-factor authentication. As shown in FIG. 2, a plurality of different accounts for one or more services can be setup within one client application 130. When setting up two-factor authentication, the two-factor authentication application can allow a user to simply specify a new account to be added before accessing the outside service 140. In response to creating a new account, an identifier will be presented through the client application 130, and a user will transfer the identifier to the outside service 140. Transparently, the outside service 140 will use the identifier to access a public key that corresponds with a private key associated with the newly created account.

As described, a plurality of outside services 140 can be involved in the activation process and act as the destination of the public key. The outside service 140 can be any system or service that may require a key of a key pair. In the two-factor authentication example above, the outside service 140 can be any service that includes an account system requiring user authentication. The outside service 140 can be a web platform, a computing device, an enterprise solution, or any suitable system. The outside service 140 can be network accessible over the internet, but may alternatively be operative within an internal intranet or local network. The outside service 140 has at least partial network communication access to the key master service no. The outside service 140 will preferably include a user interface through which a key identifier can be received during a user-initiated transfer. For example, an account settings page for a web platform may offer the option configure a device for two-factor authentication. As opposed offering some user flow that results in establishing communication with the client application 130 and transferring tokens directly, the device registration interface may be a simple text field in which the key identifier is provided. The key identifier may alternatively be provided through an audio recording or image capture. Additional information may additionally be captured during the registration processes such as user authentication credentials, user location information, and other information that may be used in enforcing policy by the key master service no. The outside service 140 then can communicate with the key master service 110 to request the key using at least the key identifier. If the request is successfully fulfilled, the key is transferred to the outside service 140 where it is ideally stored in association with the associated account. With the public key established in the outside service 140 the key pair can be used for cryptographic interactions with the client application 130.

2. Method for Cryptographic Key Distribution

Figure 3:
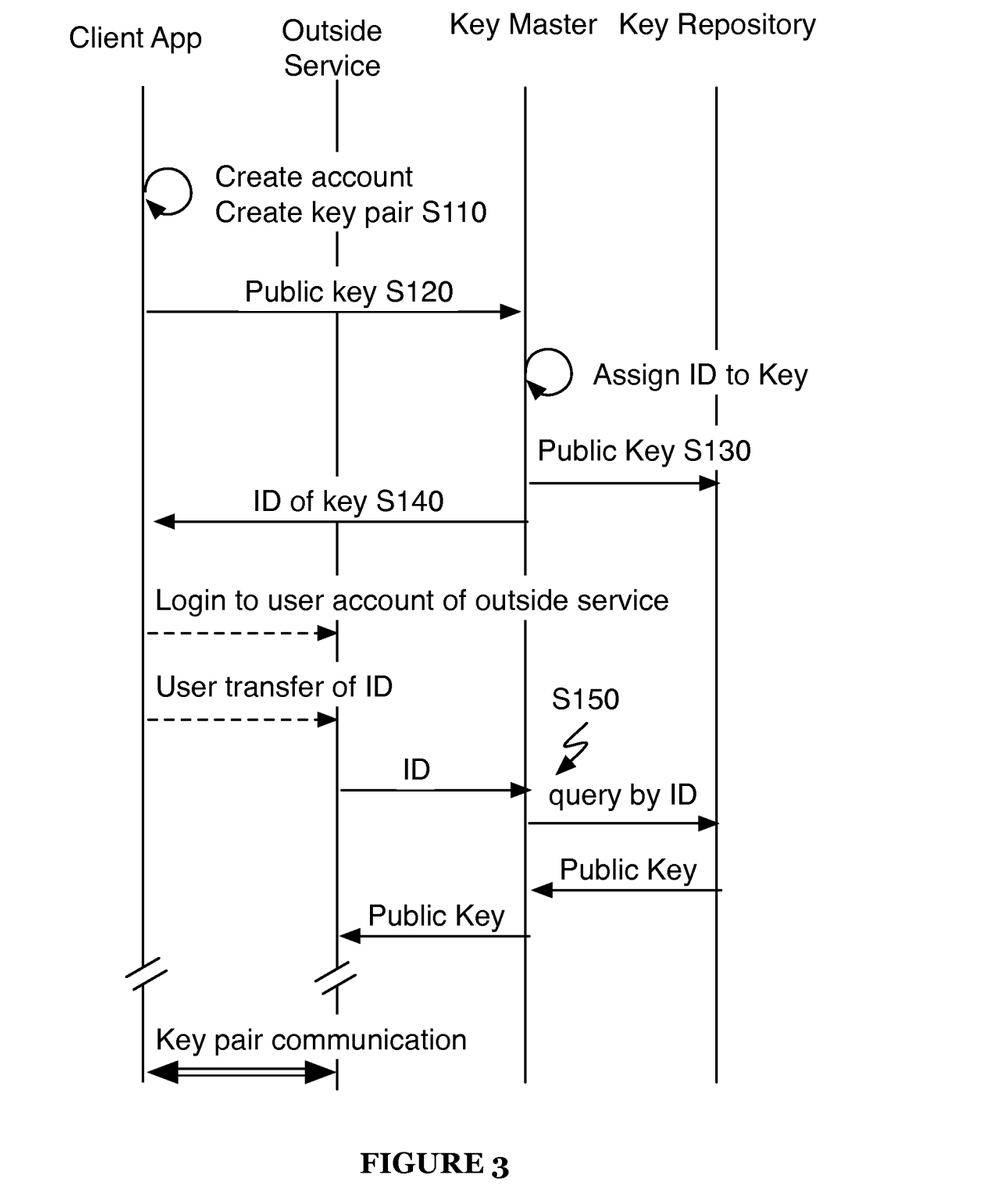
FIG. 3 is a communication flowchart of a method of a first preferred embodiment.

As shown in FIG. 3, a method S100 for cryptographic key distribution of a first preferred embodiment includes creating a key pair at a first device S110, receiving a public key of the key pair at a key master service S120, storing the public key at the key master service indexed, at least in part, by a key identifier S130, transmitting the key identifier of the public key to the device S140, and receiving a request of the public key and responding with the public key S150. The method functions to enable a centralized activation scheme where the key master service can act as a temporary key escrow service. The method is primarily used with systems dependent on key pairs shared between a client device and an outside service. The method is particularly applicable to situations where the client device is not pre-configured for a public key destination—at the time of account creation on the device, there may be no known URL or endpoint of the desired outside service for the public key. In an exemplary scenario, a two-factor authentication application may be usable for a variety of outside systems, but the outside systems are not pre-configured in the application. The method can facilitate the transfer of a public key to one of these outside devices.

The method is preferably used during activation of an account on a client application. Herein, a two-factor application is used as a preferred version of a client application and use of the method, but the method may be applied to any suitable system where a key pair used during activation needs to be distributed between a client application and a service. The method is preferably employed during the activation portion of an account on a client device such as when creating a new account, adding a new device to the account, or updating an existing device and account.

Figure 4:
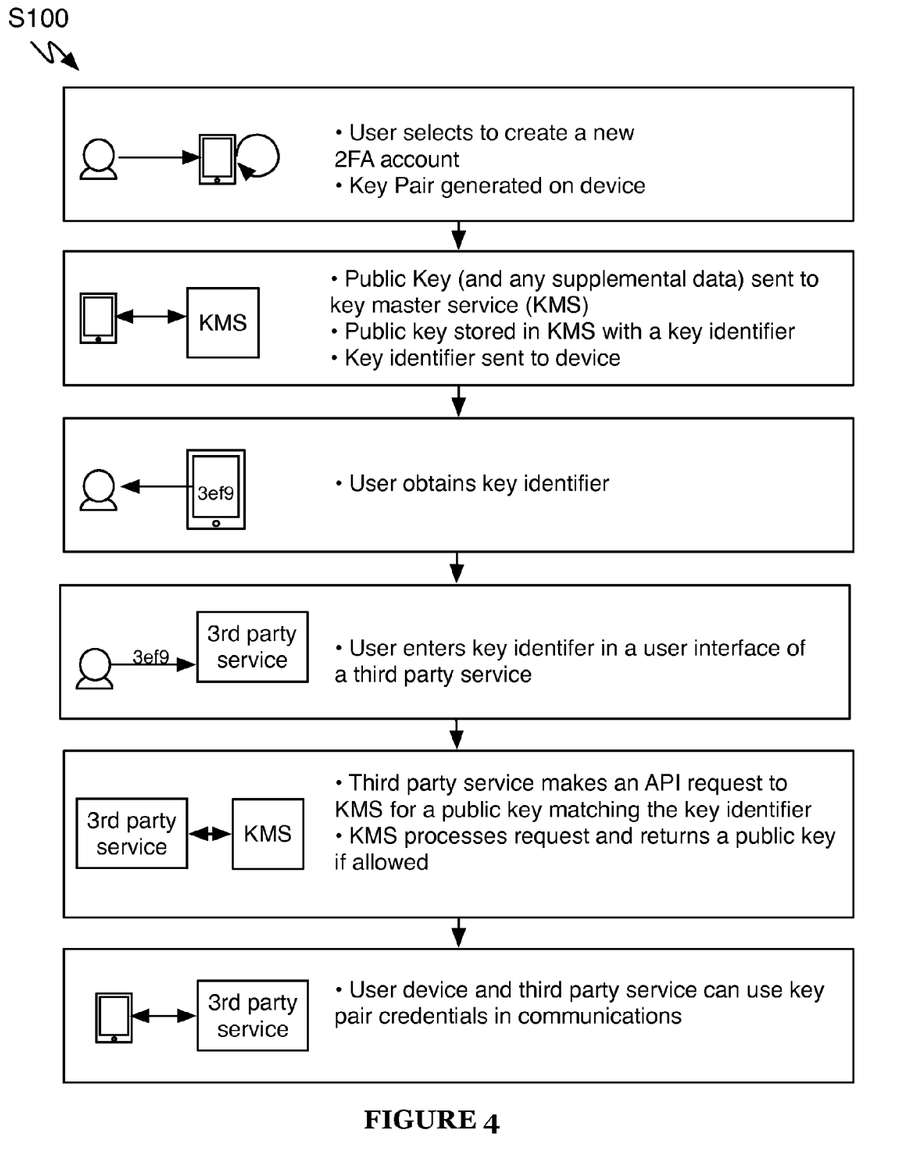
FIG. 4 is a flowchart representation of an exemplary user flow of a first preferred embodiment.

As shown in FIG. 4 for one exemplary user flow, a user will decide to use the two-factor authentication with an outside service. The user can create a new two-factor authentication account on personal device, which will eventually be associated with the outside service. The account on the device is instantiated independently of an account on the outside service. A key pair is generated for the account instance on the client application. The public key is transmitted to a key master service, and in response the client application receives an identifier. The identifier is preferably in a format such that the identifier can be easily transferred to an outside service. The identifier in one implementation is a code displayed to the user. The user then proceeds to login to an account or create an account on the target outside service. An option is selected to configure two-factor authentication through the two-factor authentication platform. The user supplies the identifier to the outside service, and then the outside service fetches the public key associated with the identifier from the key master service. With the public key, cryptographic communication using the key pair can occur between the client application instance and the outside service.

Block S110, which includes creating a key pair at a first device, functions to establish the private key and a public key. The key pair is preferably created or generated in response to a user or application action. In one implementation of the method S100, Block S110 is executed outside of operation of the method by a client application distinct from the system including the key master service. The key pair preferably includes a private key and a public key. A key is preferably a sequence of characters, be any suitable data object. Alternatively any suitable number of cryptographic tokens and token relationships may be used depending on the cryptographic key types. The private key is preferably stored within the host device in the client application or an alternative private data storage solution of the device. Generating the public key pair preferably uses an asymmetric key algorithm, but any suitable approach may be used. In one variation a public key distribution model mechanism is implemented. In a public key model, a client application could pass a symmetric key to the key master service and an outside service can pull it in using a similar key identifier key scheme. The key pair is created on the host device that intends to use the private key. The host device preferably stores the private key and will transmit the public key such that the public key is eventually stored by a target outside service (with initial storage in the key master service). The public key is preferably transferred through an API of the key master service. Herein key pairs and more specifically asymmetric key pairs are used in describing the method, but the method can alternatively be used in distributing other types of cryptographic tokens. In alternative implementations, the public key described in the method may be any suitable key or token to be shared between the device and the outside service. For example, the generated key on a mobile device could be a symmetric key. In this variation, the method may include receiving a key message at a key master service, wherein the key message originates from a first client application (S110); associating a key identifier with a first key of the key message (S120); storing the first key at the key master service indexed at least by a key identifier (S130); receiving a request for a key from an outside service, wherein the request specifies a key identifier (S140); and responding to the request with a key according to the key identifier (S150). If the key identifier of the request matches the key identifier mapped to the first key, and the request satisfies any policy conditions (e.g., it authenticates, key is not expired, etc.), the response to the request preferably includes the first key. The API can be a REST API using an application layer protocol such as HTTP, HTTPS, or SPDY. The API may alternatively be any suitable type of API. In addition to creating the key pair, the client application may additionally collect or generate additional information such as a user-specified key identifier, user geographic information, user authentication credentials, outside service identifiers (e.g., name, domain name, label, etc.).

The key pair is preferably created in response to an event on the client application. In one exemplary use-case, the key pair is generated in response to a user selecting an option to create a new account association within the application. The account association may be used for authentication, two-factor authentication, or any suitable use. Associated with creating the key pair, the method can include instantiating an account in the client application. The account can be instantiated independently of a pre-existing account. Being instantiated independently preferably describes the creation context where the outside service is not contacted or used during the creation, and at the very least, the public key is not transferred to the outside service (before additional processes of the method).

The host device is preferably a mobile computing device such as a mobile phone, a tablet, a wearable computing device, but the host device can alternatively be a desktop computing device, a TV connected computing device, or any suitable computing device. The key is more particularly generated according to a client application operative on the device. In many implementations, the application will use the private key to talk with an outside service.

In one implementation, the client application is a two-factor authentication application that functions to facilitate providing the second factor of authentication through the application. Preferably, instantiating an account includes activating the client application to act as a secondary factor of authentication for an outside service account. The two-factor authentication application can generally target multiple services that elect to use a two-factor platform of the two-factor application. The various services can include a wide variety of types of services. The types of services can include privately hosted outside services, an internal service operated by the same entity as the key master service operator, an enterprise internal service, and an on-premise service. The services are accessible and usable on a public network and/or a private intra-net. The use of the key master service also frees the outside service from maintaining support for direct communication of the public keys from the host device. The outside service would be free to reconfigure IP addresses, domain names, and other configurations without breaking support with the key pair distribution approach. Of these services, a machine address to the services may or may not be known, and the service in some cases may not be readily accessible for incoming communications, thereby preventing a public key to be directly transferred to the outside service.

Block S120, which includes receiving the public key of the key pair at a key master service, functions to transfer the public key to a centralized service. The client application preferably transmits the public key to a key master service using an API. The public key is preferably communicated as a public key message that can include additional meta data that can be used in storing and referencing the public key, authenticating outside service access, and/or otherwise managing the public key. The meta data can be supplemental information that can include information such as a password, a username, geolocation information, allowed outside service identifier, time expiration window, or any suitable information. Access to the API is preferably authenticated using API credentials granted to an account of the application developer. The key master service is preferably a centralized server system accessible over HTTP. The client application can POST the public key to the key master service, but can transmit the public key in any suitable manner.

Block S130, which includes storing the public key at the key master service indexed by a key identifier, functions to hold the public key at the key master service. The key master service as described is accessible by a plurality of different client applications and their respective devices/users. A plurality of keys can be stored by the key master service, and the keys can be for different devices and/or different outside services. The public keys can be stored anonymously using only an identifier to access a public key. The public keys are preferably stored such that the public keys are indexed by the key identifier—a public key can be uniquely identified and accessed using the key identifier. Storing a received public key includes generating and assigning a unique identifier to the public key. A user can use the identifier to inform an outside service how to access the public key using just the unique identifier. The identifier can be an alphanumeric code. While the identifier in one implementation is an easily human transcribable code (e.g., a 16 digit code), the unique identifier can alternatively be more complex. In the case where the identifier is complex, alternative mechanisms of transferring the code to an outside service can be used such as using QR codes or other suitable approaches. A record of the key and identifier can additionally include additional information values, which may be used in different variations of the method. For example, user credentials may be used to add a username-password-type authentication process when an outside entity tries to access of the public key. In another example, user location information may be used as a policy condition to restrict key access to identifying a geographic region substantially local to the location provided by the client application.

Figure 9:
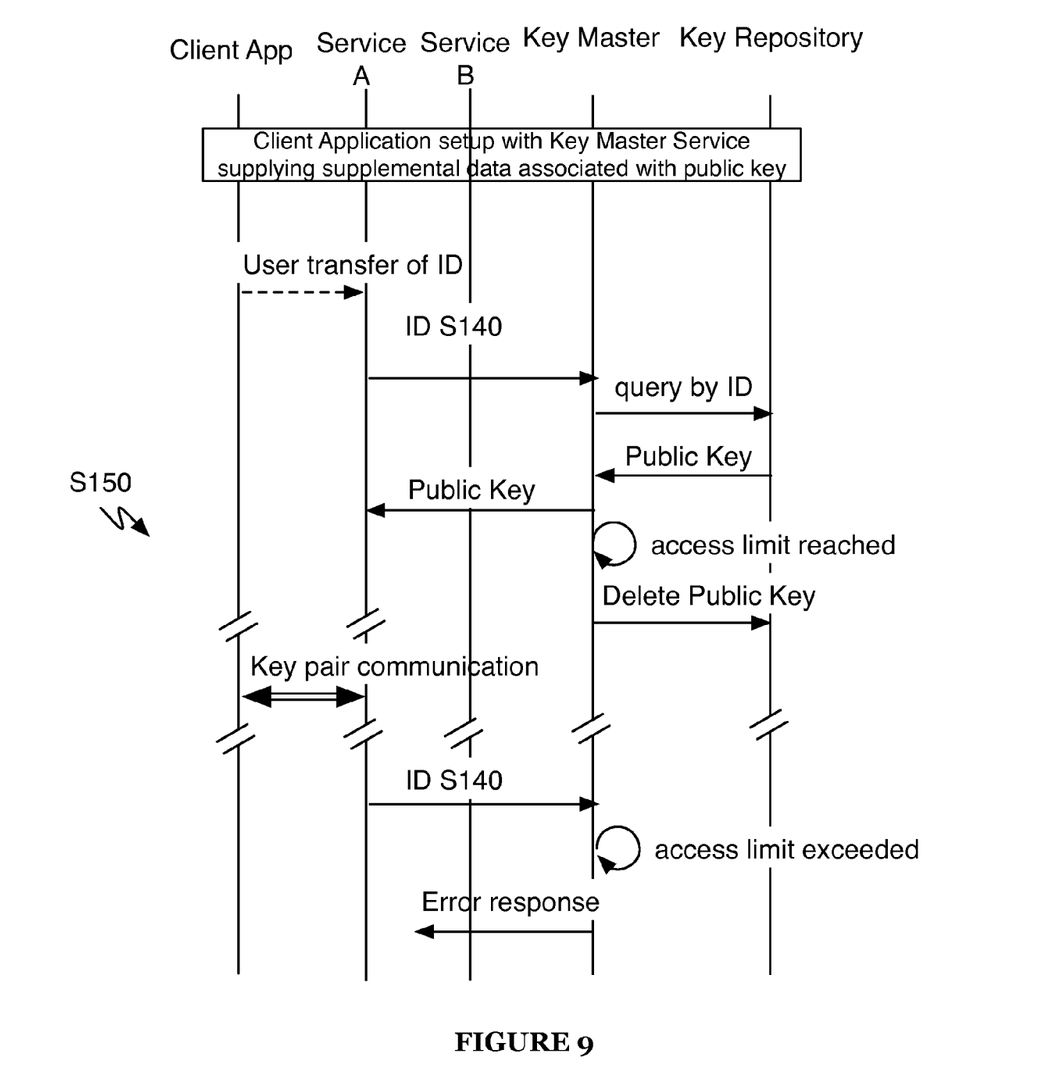
FIG. 9 is a communication flowchart of a variation of a method applying an access count limit.

The public key is preferably stored temporarily, which functions to make the key master act as a public key escrow service. The public key can be stored in the key master service for the duration required to complete transfer to a service. Accordingly storing the public key preferably includes storing the public key with an expiration condition and when the expiration condition is satisfied, removing the public key. Removing the public key can include deleting the public key and/or public key record or otherwise preventing access to the public key. The public key can expire and be deleted after a certain time-based expiration window. The time-based expiration window can be an amount of time a specified date in the future or any suitable time condition. The public key can additionally include a limited number of access attempts such that the public key is not stored after a defined number of services have accessed the key. For example, a client application uploads a public key. The user then configures an outside service, which prompts the outside service to retrieve the associated public key. When transferring the public key to the outside service, the key master service deletes the public key so that it cannot be accessed by another entity. The public keys can alternatively be maintained or stored for any suitable duration. In a first variation, the public key record is deleted after successfully being accessed and transferred to a service. The first outside service to request the key can obtain the key. The key master service may allow any number of accesses to a key before deleting the public key as shown in FIG. 9. As an additional or alternative variation, a key may have any suitable form of assigned expiration condition. The expiration condition can be based on when and how a key was accessed. When the expiration condition is met, the particular public key is deleted or removed from the key master service. In some variations, a password or other suitable mechanism can be used to secure access of the public key.

Block S140, which includes transmitting the key identifier of the public key to the client application, functions to return an access mechanism to the originating device. The key identifier can be transferred as a response to the public key. For example, an HTTP POST may submit a public key to the key master service, and the HTTP response includes the key identifier. As mentioned above, the key identifier can be an alphanumeric code. The identifier can also be a random or unique phrase. In one variation, the transmitted identifier is an encoded version of the record identifier. The medium of the encoding can be a machine-readable audio signal or a visual image such as a QR code or bar code. In one variation, the key identifier is created on the client application and thus the method may avoid transferring a key identifier from the key master service to the client application.

At the client application, the identifier is received. The identifier is used as a more readily transferable item that can be communicated to an outside service. In a first variation, the user acts as the communication channel to transfer the identifier to the desired service. The client application displays the identifier to the user; the user then accesses the outside service; and when prompted, provides the identifier information in the outside service. For example, the user can type in the 16 digit key identifier into the outside service. Having completed the transfer of the identifier, the outside service can then access the key master service, specify the identifier and obtain the public key. From the user perspective, this processes is distilled into a more seamless transaction of simply copying a code from a client application to the desired service, and the use of an identifier enables a complex key to be efficiently transferred to an unknown service with high usability.

Block S150, which includes receiving a key request for the public key and responding with the public key, functions to deliver the public key to a requesting service. The request is made by an outside service in response to an identifier having been transferred to the service. The request can be an API call or any suitable communication. The service can be operated by a variety of entities and can be any suitable form of service such as a web service, a locally hosted service within an intranet, and/or a service operated by the operator of the key master service. The outside service is configured to accept an identifier and to communicate with the key master service at a defined machine address. The key master service includes a singular addressable endpoint or otherwise a defined set of endpoints that can be consistently addressed by outside services as well as client applications. As the address of the key master service is substantially stable, changes to the client application and/or the outside service may not negatively impact key distribution as it may for a direct app-to-service exchange.

Figure 7:
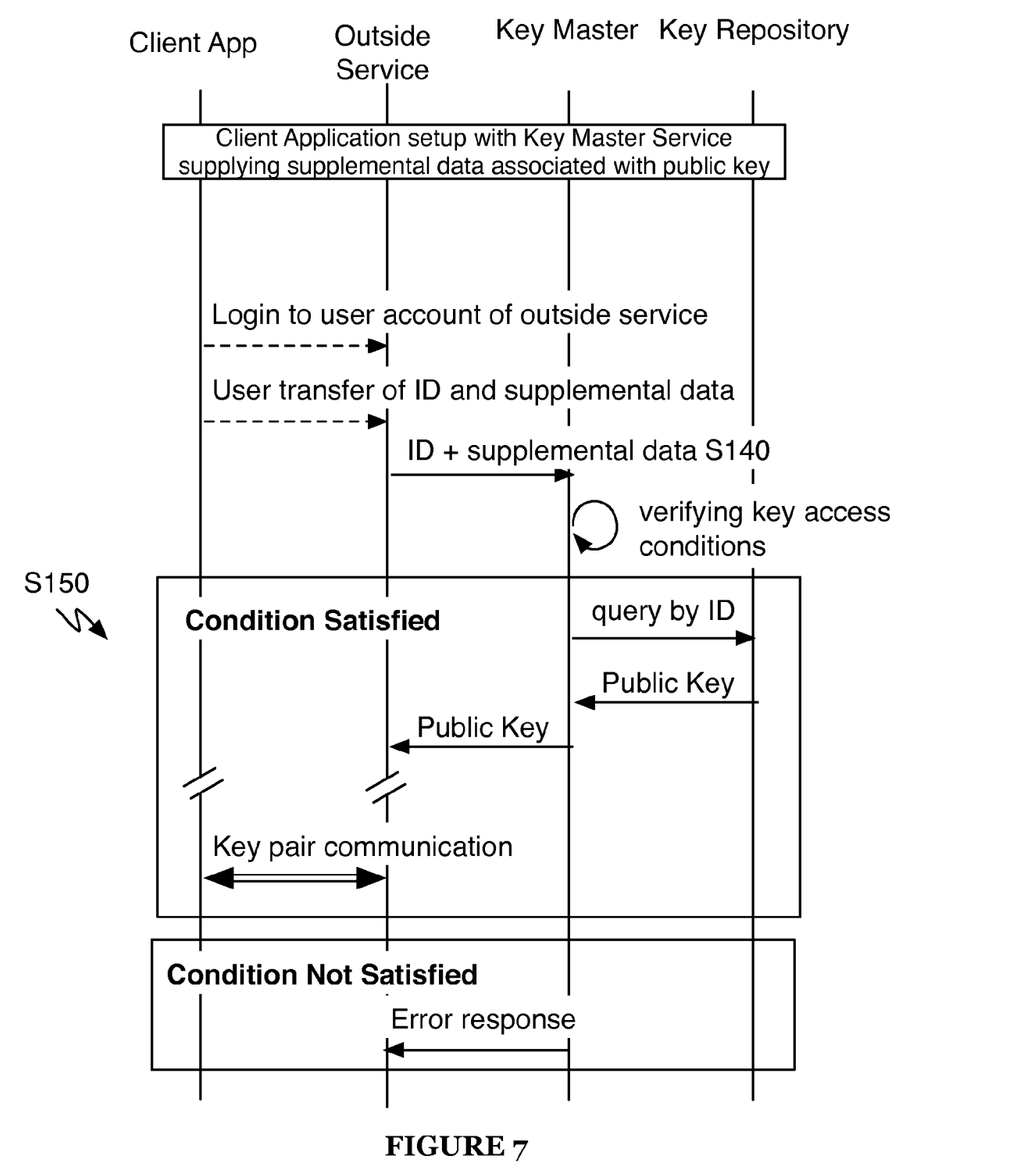
FIG. 7 is a communication flowchart of a variation of a method verifying key access conditions.
Figure 8:
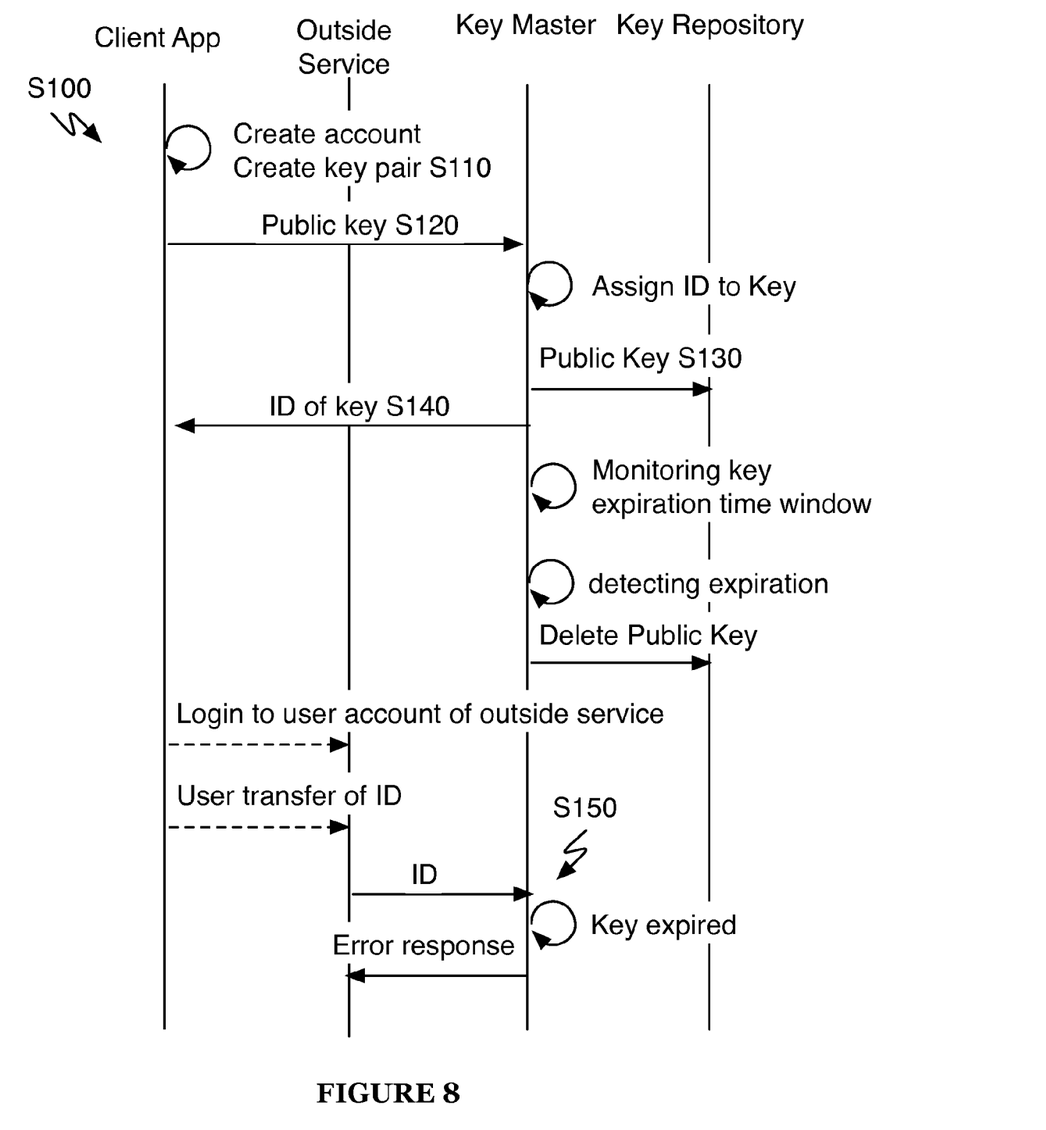
FIG. 8 is a communication flowchart of a variation of a method applying a time-based expiration window.

The received request includes at least the key identifier. The key identifier is used by the key master service to access a stored public key with a corresponding key identifier. The public key is then transmitted to the key request. The key request may additionally include other parameters used to identify and/or authenticate a key request such as a user name and/or a password. Receiving a request and responding with the public key can additionally include processing the request and optionally verifying access conditions of the request. Processing the request preferably includes using at least the key identifier to identify the corresponding public key stored in a key repository. Verifying access conditions can include verifying various conditions are met and then granting or denying access appropriately as shown in FIG. 7. In one variation, the conditions are time-based expiration windows as shown in FIG. 8. In another variation, the condition is meta-data comparison. Various meta-data properties supplied during interaction with the client application may need to match to meta-data supplied by the outside service. For example, the user may supply a domain name they intend to use with the on device account. If the API request does not originate from that domain or a related subdomain then the request may be denied. Similarly, outside services may have to be registered and have undergone an enrollment process. As part of an enrolled service provider, the outside provider may be required to request key pairs using a set of whitelisted IP addresses. Other suitable access conditions may similarly be enforced. Additionally, availability of a public key may be altered asynchronous (i.e., not in response) to actions of an outside service and/or client application events. For example, a public key can be expired prior to any access attempts are made.

As described above, upon access of the public key, the public key record in the key master service may be permanently deleted. The key may alternatively be queued for deletion, set with an expiration time, marked for removal, marked as expired, or otherwise have access blocked. Delayed removal of the key can accommodate communication errors between the key master service and the service. Similarly, the outside service may transmit a message confirming receipt of the key, and the key master service removes the key record upon confirming receipt by the service. In an alternative approach where the public key may be reused, the identifier can be expired and a new one issued so that a second outside service will need a refreshed identifier to access the same public key.

Figure 10:
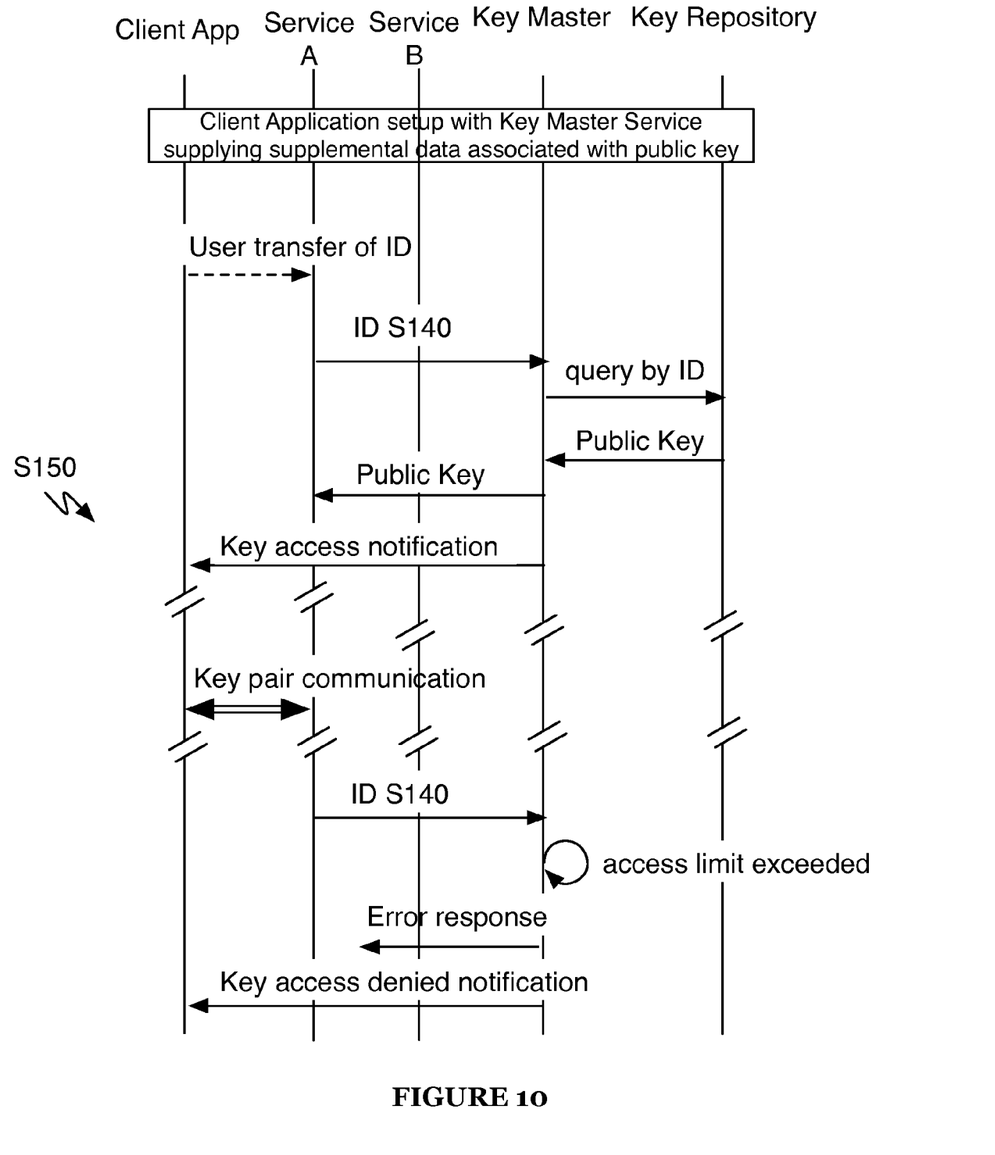
FIG. 10 is a communication flowchart of a variation of a method communicating key event information to a destination.

Additionally, the method can include transmitting a message to a destination, which functions to notify the user or interested party of key events as shown in FIG. 10. The message preferably communicates events related to public key status. The key master service can push notifications to the client application to notify the user of successful key transfer, of a key expiring soon, of a key having expired, of blocked access attempts, or for any suitable event. The message can be a push notification delivered over a push service of the device. Alternatively, the message could be any delivered communication such as an email, text message, in-app message. The message can additionally be delivered to a callback URL, which can function to notify an interested service. For example, the server-side infrastructure used to support the client application may want to be informed of events such that server-side actions can be performed. A push identifier, an email address, a phone number, device address, URL, or other destination address of the client application or user device is preferably obtained when communicating the public key from the client application to the key master service. The destination is stored in association with the public key and/or the identifier. The destination address may alternatively be obtained during previous communication.

Figure 5:
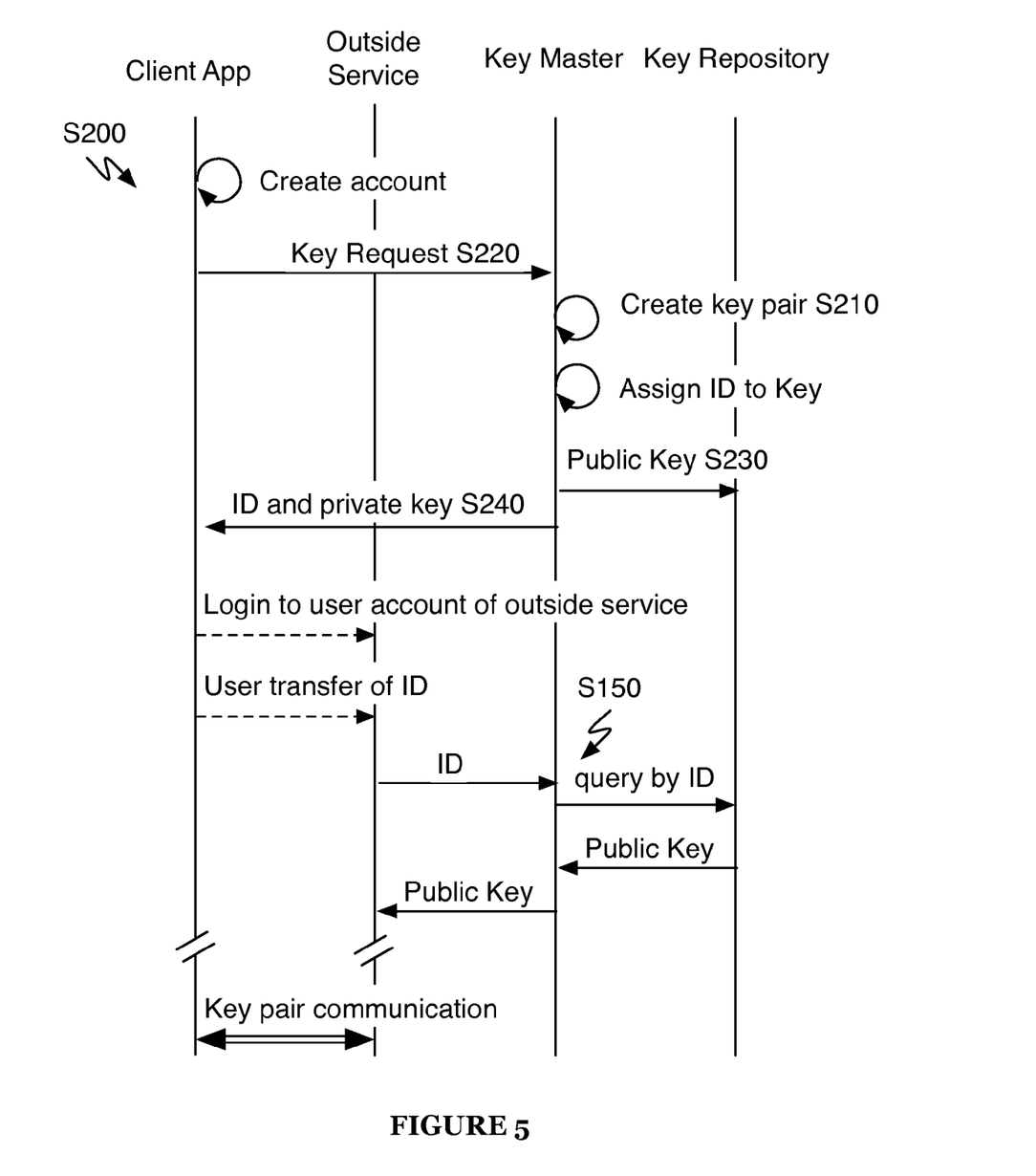
FIG. 5 is a communication flowchart of a method of a second preferred embodiment.
Figure 6:
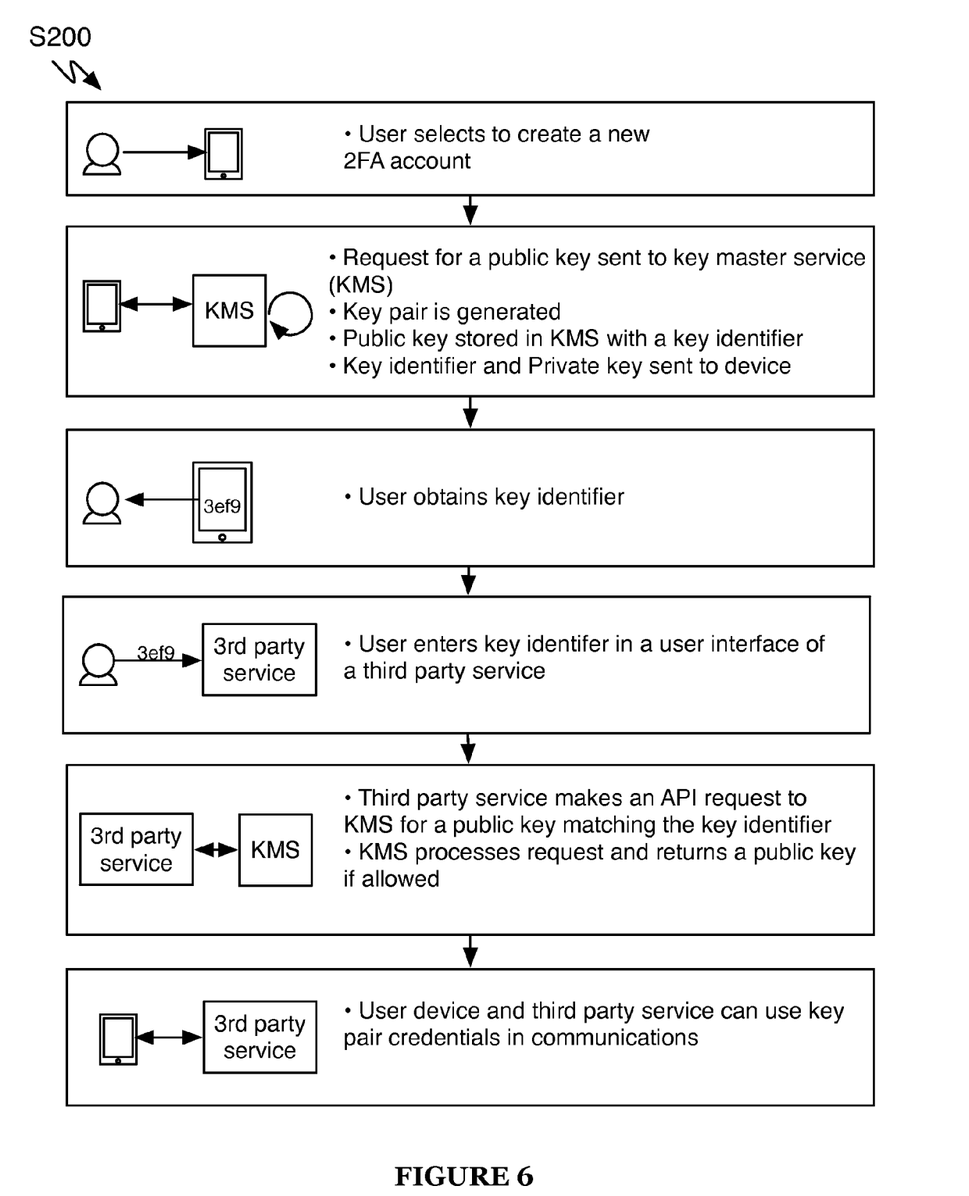
FIG. 6 is a flowchart representation of an exemplary user flow of a second preferred embodiment.

As shown in FIG. 5, a method S200 for centralized key distribution of a second preferred embodiment includes receiving the key request at a key master service S220, creating a key pair at the key master service S210, storing the public key at the key master service S230, transmitting the private key of the key pair and an identifier of the public key to the device S240, receiving a request of the public key and responding with the public key S250. Method S200 can function to provide a centralized activation scheme for key sharing through key generation off the device. The method S200 preferably has similar benefits to method S100 and includes similar variations and additional elements such as transmitting notification messages and verifying access conditions. As shown in the exemplary user experience flow of FIG. 6, a user can have a substantially similar experience, where as the key generation responsibility is changed to a centralized key management service. In method S200, the key pair is generated by the key master service. The key master service acts as the central service for generation and distribution as compared to method S100 where the key generation and communication is more distributed amongst multiple entities. Blocks S220 preferably precedes and prompts block S210. The key request in block S220 can be a simple HTTP request without any data as opposed to a request in block S120 that can include a public key. Additionally, the supplemental information such as user authentication credentials, geolocation information, outside service identifiers, and other meta data can be passed in the key request. The key master service creates or generates the key pair in a substantially similar manner to that in S110. Generating the key pair at the key master service may be a preferred alternative if the client device or application does not have the capabilities to generate the key pair or is not secure enough to have access to both keys. The key master service will preferably generate the key pair in response to a request by the client application. From a user perspective, the interaction flow will be substantially similar whether the key is generated on the device or the key master service—the user requests to create a new account on the client application and an identifier is presented to use with an outside service. Blocks S230 and S250 are substantially similar to those of Blocks S130 and S150. Block S240 is similar to S140, but S240 sends the identifier along with the private key. The client application will store the private key.

In one variation, methods S100 and S200 may be selectively employed within a single system. The client application can dynamically decide the preferred approach or be preconfigured to use one of the two key generation approaches. If a request is received at the key master service and a public key is not provided, the key master service can automatically generate a key pair and deliver the private key and corresponding identifier. However, if a key is provided in the request, then that key is stored and an identifier is returned. Dynamically deciding the key generation approach may include detecting device type of the client application and then selectively proceeding with one of at least two modes.

In a first mode, generating a key pair at the client application, communicating at least the public key to the key master service and receiving a key identifier. The first mode results in an instance use where the process substantially resembles method S100 after determining the mode. As discussed above, the first mode may be used in devices that have processing capabilities and/or security levels sufficient to generate a key and/or have at least temporary access to both keys in a key pair. In a second mode, requesting a private key and identifier from the key master service. The second mode preferably uses the remote key generation approach of method S200. The second mode may be selected for devices that have insufficient processing power or a vulnerable to attacks. In one variation, a vulnerability assessment may be run on the device and determine if the device is vulnerable to a type of attack. If the device is vulnerable to an attack then the second mode can be used to prevent the client device from having access to both keys.

As described above, the method is preferably implemented by a multi-tenant web service acting as the key master service. As a multi-tenant service, multiple client applications preferably use the service for distributing a public key to outside services. Similarly, a wide variety of outside services can use the key master service. The methods S100 and S200 are preferably performed in alongside and/or in parallel to other instances of the method. Accordingly for method S100, multiple client instances from a set of distinct client instances create key pairs, wherein each key pair is used by the respective client instance, and key identifiers unique to each key pair are received at the respective client application instance. At the key master service, the plurality of keys are received and processed individually. The key master service additionally receives key requests that specify different key identifiers, and those requests are similarly individually handled.

The system and method of the preferred embodiment and variations thereof can be embodied and/or implemented at least in part as a machine configured to receive a computer-readable medium storing computer-readable instructions. The instructions are preferably executed by computer-executable components preferably integrated with the key master service, a client application, and/or an outside service. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

What is claimed is:

1. A method for distributing credentials among electronic devices on a computer network comprising:
    at a first client application operating on a first electronic device, instantiating an account in the first client application, wherein the account is instantiated independently of a pre-existing account on an outside service, wherein instantiating the account in the first client application includes activating the first client application prior to performing a secondary factor of authentication in a two-factor authentication for a transaction involving the pre-existing account at the outside service;
    generating a key message, comprising a first cryptographic key, at the first client application;
    receiving the key message at a key master service;
    associating a key identifier with the first cryptographic key of the key message;
    storing the first cryptographic key as non-transitory data in a computer database at the key master service indexed at least by the key identifier; wherein storing the first cryptographic key comprises storing the first cryptographic key with an expiration condition, wherein the expiration condition is conditional, at least in part, on a number of requests attempting to access the first cryptographic key;
    receiving a request for a cryptographic key from the outside service, wherein the request specifies a key identifier; and
    responding to the request according to the key identifier; wherein, responding to the request comprises responding to the request by preventing access to the first cryptographic key after the expiration condition is satisfied; wherein preventing access to the first cryptographic key comprises disassociating the first cryptographic key and the key identifier.

2. The method of claim 1, wherein the expiration condition is conditional, at least in part, on a time-based expiration window.

3. The method of claim 1, wherein the key message includes authentication credentials; and wherein the request includes authentication credentials; and further comprising authenticating the request and allowing the request if the authentication credentials are verified.

4. A method of distributing credentials, the method comprising:
    implementing one of a first mode or a second mode for distributing a cryptographic key, wherein:
    (i) the first mode includes, at a key master service:
        (a) receiving a key message;
        (b) associating a key identifier with a cryptographic key of the key message;
        (c) storing the cryptographic key indexed at least by the key identifier;
        (d) receiving a request for the cryptographic key from an outside service, wherein the request specifies the key identifier; and
        (e) according to the key identifier, responding to the request for the cryptographic key by either providing the cryptographic key or not providing the cryptographic key; and
    (ii) the second mode includes, at the key master service:
        (f) receiving a request for a private key and a public key identifier, wherein a cryptographic public key is stored and indexed at least by the public key identifier;
        (g) providing the private key and the public key identifier to a device having a specific client application operating thereon; and
    implementing the first mode or the second mode based on technical attributes of the device having the specific client application operating thereon.

5. The method of claim 4, further comprising:
    generating, at the client application, a key pair including the cryptographic key of the key message and a matching private key.

6. The method of claim 4, further comprising:
    generating, at the key master service, a key pair including the cryptographic public key and the private key;
    according to the second mode, receiving a request for the cryptographic public key from an outside service, wherein the request specifies the public key identifier; and
    according to the public key identifier, responding to the request for the cryptographic key by either providing the cryptographic key or not providing the cryptographic key.

* * * * *